United States Patent [19]

McIntyre

[11] Patent Number: 4,731,168

[45] Date of Patent: Mar. 15, 1988

[54] ELECTROGENERATIVE CELL FOR THE OXIDATION OR HALOGENATION OF HYDROCARBONS

[75] Inventor: John M. McIntyre, Lake Jackson, Tex.

[73] Assignee: The Dow Chemical Company, Midland, Mich.

[21] Appl. No.: 830,049

[22] Filed: Feb. 18, 1986

[51] Int. Cl.⁴ .............................................. C25B 3/06
[52] U.S. Cl. ...................................... 204/80; 204/81; 429/17; 429/34
[58] Field of Search ............................ 204/8, 78–80, 204/79, 128, 294, 263, 266; 429/17, 34, DIG. 4

[56] References Cited

U.S. PATENT DOCUMENTS

| | | | |
|---|---|---|---|
| 3,288,692 | 11/1966 | LeDuc | 204/80 |
| 3,544,376 | 12/1970 | Connor et al. | 429/17 |
| 3,558,453 | 1/1971 | Mayell | 204/81 |
| 3,649,484 | 3/1972 | Prager . | |
| 4,108,754 | 8/1978 | Fleet et al. | 204/263 |
| 4,177,116 | 12/1979 | De Nora et al. | 204/263 |
| 4,191,618 | 3/1980 | Coker et al. | 204/128 |
| 4,370,392 | 1/1983 | Savinell | 429/17 |
| 4,457,809 | 7/1984 | Meshbesher | 429/17 |
| 4,576,878 | 3/1986 | Gahn | 429/17 |

OTHER PUBLICATIONS

Thesis for the Degree of Doctor of Philosophy at the University of Wisconsin (1973)—Miller.
Journal of Applied Chemistry (USSR) 19, 1045 (1946)—Kalinin.
Industrial Engineering Chemistry and Process Design Development, vol. 18, No. 4 (1979) Electrogenerative and Voltameiotic, Processes—Langer et al.
Journal of the Electrochemical Society 117, No. 4 510 (1970)—Langer et al.
Journal of the Electrochemical Society, vol. 129, No. 9, 1993 (1982)—Kinoshita et al.

*Primary Examiner*—R. L. Andrews
*Attorney, Agent, or Firm*—Andrew E. Pierce

[57] ABSTRACT

An electrogenerative cell and a process for the oxidation or halogenation of hydrocarbons is disclosed wherein a cell body containing a permselective membrane which divides said cell body into anolyte and catholyte compartments containing a liquid electrolyte consisting repectively of anolyte and catholyte and a porous anode and a porous cathode. Anolyte and catholyte compartments are fed respectively with a mixture of a liquid electrolyte and an unsaturated hydrocarbon and a mixture of a liquid electrolyte and a halogen or oxygen, wherein said electrolytes are fed to said cell at ambient or elevated temperature and pressure. A halogenated or oxygenated hydrocarbon is recovered and electrolytes, unsaturated hydrocarbon, halogen or oxygen are recycled to the cell.

11 Claims, 2 Drawing Figures

ELECTROGENERATIVE CELL FOR THE OXIDATION OR HALOGENATION OF HYDROCARBONS

BACKGROUND OF THE INVENTION

1. Field of the Invention

The invention relates to the oxidation or halogenation of hydrocarbons by a process termed electrogenerative wherein the free energy of reaction is partially converted directly into potentially useful electric energy while the main product of value is produced.

2. Description of the Prior Art

The halogenation of hydrocarbons, for instance the chlorination of ethylene to produce 1,2-dichloroethane is carried out in a chemical method by reacting anhydrous ethylene saturated with ferric chloride at a temperature of 50° centigrade. The yield of 1,2-dichloroethane (calculated for chlorine reacted) approaches 100%. The chemical method for preparing 1,2-dichloroethane involves a preliminary production of chlorine, a subsequent purification thereof, compression and thorough drying of the chlorine since moisture impairs the process parameters by inactivating ferric chloride which is required to inhibit the substitutive chlorination of ethylene.

Also known is a method for preparing 1,2-dichloroethane utilizing an electrolysis cell containing about 4% to about 20% aqueous hydrochloric acid as an electrolyte at a temperature between 20° to 70° centigrade with the simultaneous supply of ethylene into the anodic space. A combination of ethylene and aqueous hydrochloric acid is fed into the anodic space at such a rate that the amount of hydrochloric acid fed into the solution is ten times higher than its stoichiometric amount. The current yield of 1,2-dichloroethane is 20% to 44%. This is equivalent to the yield calculated based upon reacted chlorine in the chemical method.

Prior art methods of electrogenerative halogenation of hydrocarbons are discussed in a thesis submitted in partial fulfillment of the requirements for the degree of Doctor of Philosophy by Miller at the University of Wisconsin (1973). Electrolytic oxidation and chlorination of ethylene are discussed by Kalinin et al in *Journal of Applied Chemistry*, 19, No. 10-11, 1045-1058 (Russian) (1946). Electrogenerative processes are disclosed by Langer et al in *Industrial Engineering Chemistry and Process Design Development*, 18 No. 4 (1979) pages 567 to 579 and in Langer et al *Journal of The Electrochemical Society* pages 510-511, April 1970. A flow through electrochemical cell is disclosed in Kinoshita and Leach in the *Journal of The Electrochemical Society* 129 No. 9, pages 1993-1997 (September 1982).

In none of these references is the applicant's novel flow through electrogenerative cell or process for the oxidation or halogenation of hydrocarbons disclosed.

SUMMARY OF THE INVENTION

A flow through cell for use in producing halogenated hydrocarbons or oxidized hydrocarbons is disclosed wherein an electrogenerative cell having a cell body enclosing an anolyte compartment containing a porous anode and a catholyte compartment containing a porous cathode separated by a permselective membrane is fed an anolyte in admixture with a hydrocarbon and a catholyte in admixture with either oxygen or a halogen gas at ambient temperatures and pressures. The electrogenerative cell can be operated at elevated temperatures and pressures to improve the efficiency thereof.

DETAILED DESCRIPTION OF THE INVENTION

Figure 1:
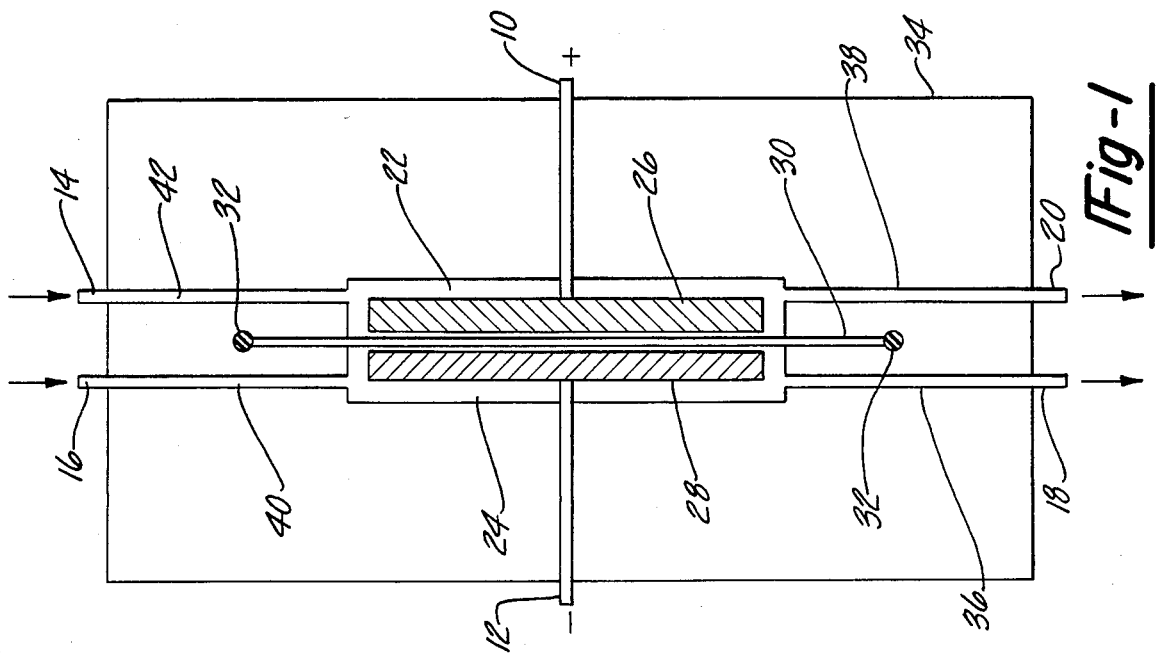
In FIG. 1 there is shown a schematic drawing of the electrogenerative cell of the invention.

Referring to FIG. 1, the electrogenerative cell of the invention is shown as 34 which encloses anolyte compartment 22 and catholyte compartment 24 separated by permselective membrane 30 which is held in place by cell body 34 and sealed using O ring 32. Anode 26 is provided with current through lead 10 and cathode 28 is electrically connected through lead 12. Electrolyte at elevated temperature and pressure is fed through conduits 14 and 16 and exits respectively through conduits 20 and 18.

The porous electrodes utilized in the electrogenerative cell of the invention can be any of the porous particulate carbon based electrodes bonded with a thermoplastic polymer such as a halogenated hydrocarbon polymer. Electrodes characterized as gas diffusion electrodes can be used. These generally comprise an electrochemically active hydrophilic layer of particulate carbon and a hydrophobic polymer binder. The electrodes generally are in electrical contact with a current collector or current distributor which can be a metal mesh. The hydrophobic polymer can be a thermoplastic halocarbon polymer such as polytetrafluoroethylene so as to provide a binder sufficiently resistant to the conditions of the cell environment. Such halogenated hydrocarbons useful in preparing halogenated polymers for use as the binder for the electrodes of the invention are the polymers of polytetrafluoroethylene, fluorinated ethylene propylene, copolymers thereof having the moieties $(-CX_1X_2-CX_3CX_4-)$, $(-CY_1Y_2-CY_3Y_4-)$, and hopolymers having the moieties $(-CY_1Y_2-CY_3F-)$ wherein $X_1$, $X_2$, $X_3$, $X_4$, $Y_1$, $Y_2$, $Y_3$, and $Y_4$ are selected from the group consisting of fluorine, chlorine, and hydrogen, at least one of said X and Y being fluorine. Preferably the halocarbon polymer is a fluorocarbon polymer selected from the group consisting of at least one of copolymers having an ethylene moiety and a fluorocarbon moiety chosen from the group consisting of $(-CFH-CH_2-)$, $(-CF_2-CH_2)$, $(-CF_2-CFH-)$, $(-CF_2-CF_2-)$, and $(-CH_2-CClF-)$.

Suitable hydrophobic polymers can generally include any polymer having a low surface energy which will remain stable under fuel cell or chlor-alkali electrolysis cell operating conditions. Such polymers include polymers of various halogen-substituted hydrocarbon monomers, particularly fluorine-substituted olefinic monomers. Halogen-containing polymers that can be employed include polymers of fluorocarbons and substituted fluorocarbons wherein one or more fluorine atoms are replaced by hydrogen, chlorine, or bromine.

Alternative halocarbon polymers include polytrifluoroethylene, polyvinyl fluoride, polyvinylidene fluoride, polytrifluorochloroethylene, and copolymers of different fluorocarbon monomers such as copolymers of tetrafluoroethylene and hexafluoropropylene.

In addition to the halocarbon polymers, various other hydrophobic polymers which can be used which include hydrocarbon polymers having a molecular weight of 50,000 to 1,000,000 or more, and a free surface energy close to or below that of polyethylene. Representative polymers include polymers and copolymers of ethylene, propylene, 3-ethyl-1-butene, 4-methyl-1-pentene, and 4,4-dimethyl-1-pentene. Silicone polymers are also suitable as hydrophobic polymers for use in the preparation of the porous electrodes.

The conductive carbon utilized in the formation of the hydrophilic layer of the gas diffusion electrodes utilized can be any electrically conductive, particulate, hydrophilic carbon. For instance, acetylene black having a small particle size which is electrically conductive can be used. Certain other carbon blacks such as furnace black are also electrically conductive and can be used. The carbon used can be porous or non-porous. Generally, carbon blacks having a particle size ranging from about 0.01 to about 0.05 microns, and more usually within the range of about 0.01 to about 0.03 microns are suitable. Methods of preparing gas diffusion electrodes are well known in the art and are disclosed in U.S. Pat. Nos. 3,442,715; 4,354,958; and 4,456,521; all incorporated herein by reference.

An electrochemically active catalyst can be admixed with the carbon black but the gas diffusion electrode is operative without the addition of catalyst and in some reactions the catalyst can be poisoned by one of the reactants so as to deactivate the catalyst. Useful metals from which an electrochemically active catalyst can be selected are the precious metal catalysts such as silver, platinum, palladium, rhodium, and the like or metal oxides such as combinations as nickel oxide and lithium oxide. Additional metals from which to select an electrochemically active catalyst are chromium, tungsten, molybdenum, cobalt, nickel, silver, copper, platinum, palladium, rhodium, iridium, and other metals such as manganese and inorganic compounds containing one or more of such metals, for instance, nickel oxide, manganese oxide, cobalt molybdate, vandium pentoxide, and the like.

The electrodes can also be selected from the carbon felt type porous electrodes described in the Kinoshita et al reference cited above. In this type of electrode, carbon fibers, for instance, those having a diameter of $2.54 \times 10^{-3}$ and a porosity of 0.86 are prepared by pressing so as to make an electrode having a thickness of 0.175 centimeters. Generally the thickness of the anode and cathode are identical to prevent a differential pressure drop.

The electrodes can be directly connected to a current lead or they can be electrically attached to a current collector or current distributor means such as a metal wire mesh. The metal wire mesh can be a woven mesh fabric such as a $20 \times 20 \times 0.010$ inch silver-plated nickel wire mesh. Preferably wire meshes having less than 0.015 inch dimension wire strands and greater than 10 strands in each direction per inch are used. The wire mesh current collector can be prepared from a metal selected from the group consisting of stainless steel, nickel, platinum group metals, valve metals, and mixtures thereof. Preferably the metal mesh is prepared from a metal selected from the group consisting of silver or silver-coated nickel, or silver-coated steel, and silver-coated valve metals.

Separating the anion and cation porous electrodes, there is used an ion exchange permselective (permionic) membrane, generally an anion-exchange membrane. Examples of anion-exchange membranes are those containing an anion selective group, such as a quaternary ammonium group, a secondary amine group, or a tertiary amine group. Exemplary anion selective permionic membranes include ammonium derivatives of styrene and styrene-divinyl benzene polymers, amine derivatives of styrene and styrene-divinyl benzene, condensation polymers of alkyl oxides with amines or ammonia, ammoniated condensation products of acrylic and methacrylic esters, iminodiacetate derivatives of styrene and styrene-divinylbenzene.

The electrogenerative cell of the invention is applicable to the oxidation of unsaturated hydrocarbons and the halogenation of unsaturated hydrocarbons in a direct reaction between said hydrocarbon and the oxygen or halogen gas present in the electrolyte while the cell is operated as an electrochemical cell. In operation, the cell is connected to an external electrical circuit and a mixture of an electrolyte and an unsaturated hydrocarbon are fed to the anolyte compartment at ambient temperatures and pressures. Elevated pressure and temperature conditions can be used with certain hydrocarbon reactants to increase cell efficiency as compared to permissible operation at ambient temperatures and pressures. At the same time, a mixture of an electrolyte and oxygen or halogen are fed to the catholyte compartment of the cell at ambient or at elevated temperature and pressure conditions. The depleted mixture of electrolyte and oxygen or halogen fed to the cathode is made up to the original concentration and recirculated to the cell. The mixture of unsaturated hydrocarbon and electrolyte fed to the anode of the cell is also made up to original concentration following depletion by reaction at the anode and recirculated to the cell subsequent to the removal of the reaction product from this stream.

More specifically, an unsaturated hydrocarbon such as ethylene is mixed with an aqueous solution of phosphoric acid, as an electrolyte, and circulated preferably under elevated temperature and pressure conditions to the anode of the electrogenerative cell of the invention while at the same time there is circulated to the cathode of the cell a mixture of an aqueous solution, preferably a saturated solution, of sodium chloride admixed with chlorine gas. The major product of the reaction is 1,2-dichloroethane which is produced in a yield based upon the chlorine reacted of about 90% to about 97% by weight. A minor byproduct consisting of ethylene chlorohydrin is produced in the amount of about 3% to about 10% by weight. Concurrent with the production of the halogenated hydrocarbons, electrical power is produced by the reaction.

The electrogenerative cell of the invention is also suitable for the electrochemical oxidation of hydrocarbons. The electrolytic oxidation of ethylene is discussed in the above referenced article by Kalinin et al entitled "Electrolytic Oxidation and Chlorination of Ethylene". Following the procedures set out in this article, an electrolyte and ethylene are fed to the anolyte compartment and an electrolyte and oxygen mixture are fed to the catholyte compartment.

Other unsaturated hydrocarbon reactants can be used in addition to ethylene and propylene as reactants. For instance, 1-butylene and 1,3-butadiene when utilized in the electrogenerative cell of the invention produce 1,2-dichlorobutane and cis-1,4-dichloro-2-butene respectively. The most useful hydrocarbons for oxidation or halogenation are the olefins.

It has been found that the use of phosphoric acid as an electrolyte with water as the solvent in the form of the commonly available 85% phosphoric acid aqueous solution has particular advantages as an electrolyte and solvent for the hydrocarbon, particularly ethylene. It has been found that the solubility of ethylene in 85% phosphoric acid increases as the pressure is increased and decreases as the temperature is increased. Ethylene dissolved in various electrolytes was utilized in the cell of the invention at various temperatures. It was found that the phosphoric acid 85% aqueous solution as an electrolyte was far superior to the other electrolytes tested as indicated in table 1.

TABLE 1

Effect of Electrolyte and Temperature on Cell Performance

| Electrolyte | Temperature °C. | Cell Volts (mv) | Current (ma/in$^2$) |
| --- | --- | --- | --- |
| NaCl in water (saturated) | 50 | 53.3 | 6.8 |
| KOH 35% aqueous | 80 | 38.0 | 4.8 |
| H$_2$SO$_4$ 3 Normal | 80 | 53.5 | 6.8 |
| H$_3$PO$_4$ 85% aqueous | 80 | 85.5 | 10.8 |
| H$_3$PO$_4$ 85% aqueous | 150 | 210.0 | 26.7 |

The following examples illustrate the various aspects of the invention but are not intended to limit its scope. Where not otherwise specified throughout this specification and claims, temperatures are given in degrees centigrade, and parts, percentages, and proportions are by weight.

EXAMPLE 1

The flow-through electrogenerative cell was designed incorporating porous carbon electrodes. Each electrode consisted of three pads of WDF Graphite Felt, 0.224 inches thick, as purchased from Union Carbide Corp., Carbon Products Division. Prior to cell assembly these electrodes were activated by boiling in 70% nitric acid for two hours and rinsing in demineralized water. The electrodes were placed in two cell halves which were separated by a Raipore, 0.002 inch thick fluorinated, glass reinforced, anion exchange membrane (number 4035). The cell halves were constructed from three inch pipe flanges. Blind flanges were used for ends and open flanges for electrode reservoirs. Titanium was used for the cell half exposed to brine and chlorine and Hastelloy B was used for the half exposed to phosphoric acid and ethylene. The inner surface of the titanium blind flange was coated with RuO$_2$, by thermal decomposition of a RuCl$_4$ solution, to provide an electrically conductive surface through which current was conducted from the electrode. A thin sheet of silver metal was placed on the inner surface of the Hastelloy B blind flange to provide electrical contact to the other electrode.

The 85% phosphoric acid anolyte, contained in an external reservoir at ambient temperature, was saturated with ethylene gas at a desired pressure which ranged from 45 to 75 psia. The pressure was held constant during each experiment by means of a regulated ethylene gas pressure in the anolyte reservoir. Likewise, a 20% brine catholyte was saturated with chlorine at ambient temperature and the pressure was held constant by regulated chlorine gas pressure over the catholyte. The gas pressure in the catholyte was maintained identical to the pressure in the anolyte by means of a differential pressure controller to insure that a differential pressure within the electrogenerative cell would not develop which could rupture the anion exchange membrane separator.

Flows of the ambient temperature, saturated and pressurized, electrolytes were controlled at 40 cubic centimeters per minute as they passed from the reservoirs through tubing to the bottom of the cell. The cell and portions of the tubing were submerged in a controlled temperature bath which was held at 75°, 90°, or 105° C. during each experiment. Adequate tubing was used to insure that the electrolytes were at the desired temperature prior to entry into the cell. The electrolytes exited from the top of the cell and the pressures were reduced to ambient. Unreacted gas and products were allowed to escape. The electrolytes could be recycled which would be desired in a continuous operation, but were not during this experiment.

Samples of the anolyte and gaseous effluents from the hot anolyte were collected and analyzed by gas chromatographic techniques. The major product, greater than 95%, was 1,2-dichloroethane.

The external electrical circuit consisted of copper wires connected to the two current collectors. These wires were connected to an external high precision, one ohm resistor. A high impedance volt meter was connected in parallel across the resistor and the voltage was measured. The current flowing through the external circuit was determined using Ohm's law and current densities were obtained by dividing this current by the cross sectional area of the electrodes which was about 10 square inches.

Results of this experiment are shown in the following Table 2.

TABLE 2

Performance of a Dichloroethane Producing Electrogenerative, Pressurized Flowthrough Cell Operated with a One Ohm External Resistance

| Temp (°C.) | Pressure (psia) | | | | | | | |
| --- | --- | --- | --- | --- | --- | --- | --- | --- |
| | 45 | | 55 | | 65 | | 75 | |
| | Volts | Amps/in$^2$ | Volts | Amps/in$^2$ | Volts | Amps/in$^2$ | Volts | Amps/in$^2$ |
| 75 | 0.212 | 0.021 | 0.532 | 0.053 | 0.593 | 0.059 | 0.580 | 0.058 |
| 90 | 0.450 | 0.045 | — | — | 0.570 | 0.057 | 0.594 | 0.059 |
| 105 | 0.504 | 0.050 | 0.520 | 0.052 | 0.528 | 0.053 | 0.527 | 0.053 |

EXAMPLE 2

Figure 2:
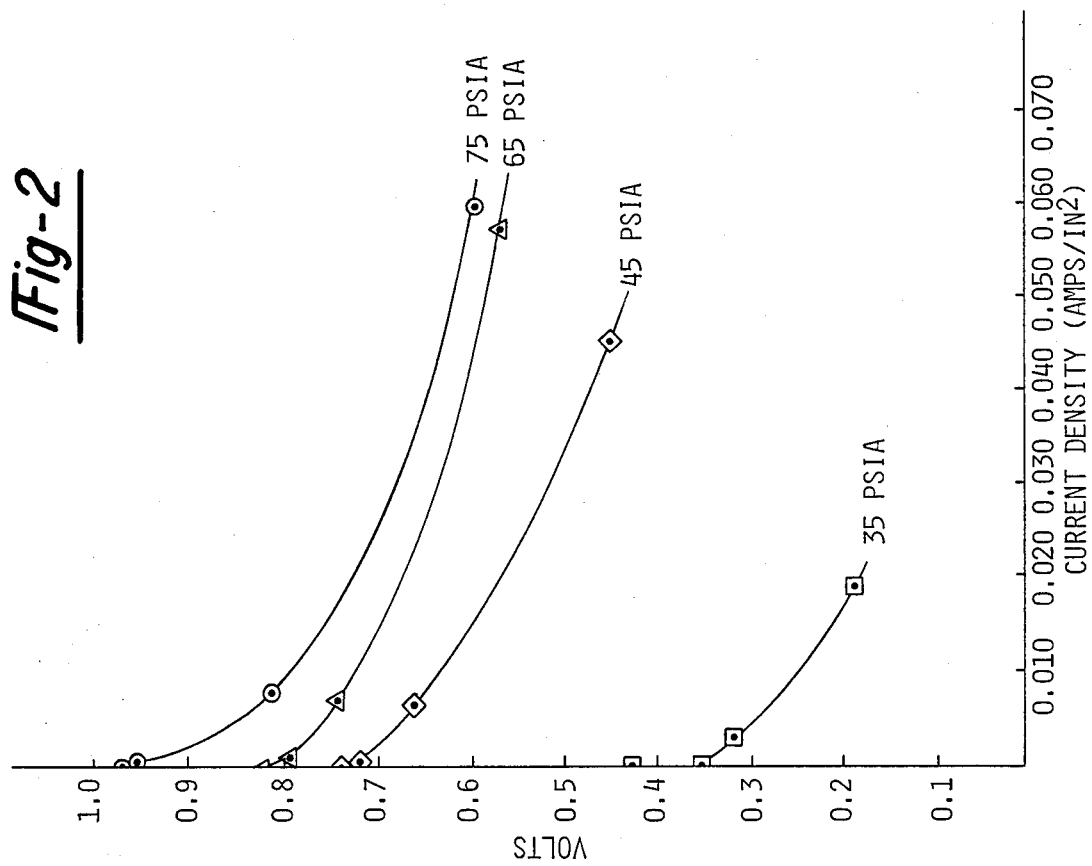
In FIG. 2 there is shown the performance of one embodiment of the electrogenerative cell of the invention using ethylene as a feed gas.

The cell described in Example 1 was assembled with new electrodes and operated in a like manner except that external electrical resistances and the pressures were varied during operation. The results of this experiment conducted at 90° C. are shown in FIG. 2. The data was collected over a period of a few weeks during which the cell was typically operated for eight hours a day at temperatures varying from 75° to 105° C. Results were consistent within experimental error during the test period.

EXAMPLE 3

The cell in Example 1 was assembled with new electrodes and operated in a like manner except the anolyte was a 20% sodium chloride solution instead of 85% phosphoric acid. Operating at 105° C. and 75 psia with a one ohm external resistance, the cell produced 0.170 volts and 0.017 amps per square inch which was significantly lower than results of 0.527 volts and 0.0527 amps per square inch which were previously obtained under identical conditions when an 85% phosphoric acid anolyte was used.

EXAMPLE 4

The cell in Example 1 was assembled and operated in a like manner except platinized carbon felt electrodes were employed. Two procedures were used to platinize the carbon felt. The first, reported by Baltzly (J.Amer.-Chem.Soc., 74, 4586 (1952), entailed submerging the electrode in a solution of 2.65 grams of 10% $H_2PtCl_6$ solution plus 1 drop of a 5% $PdCl_2$ solution plus 30 ml of deionized water per gram of carbon while hydrogen gas was sparged through the room-temperature solution for 30 minutes. The solution was then poured off and the electrode was stored in methanol saturated with $H_2$ until used. The second procedure, developed by Brown and Brown (J.Amer.Chem.Soc., 84, 1494 (1962), comprised submerging the felt pad in a solution of 2.65 grams of 10% $H_2PtCl_6$ solution mixed with 40 ml of ethanol per gram of electrode. After purging with nitrogen, 3 grams of a 12% $NaBH_4$ solution per gram of electrode was added. After 15 minutes, the solution was rinsed 3 times with deionized water and then stored in methanol saturated with hydrogen until used. When removed from the methanol and allowed to air-dry, these electrodes were pyrophoric, so they were rinsed in deionized water and kept damp during the cell assembly.

Results of this experiment conducted at 105° C. and 75 psia with a one ohm external resistance were 0.486 volts and 0.0486 amps per square inch for the first electrode and 0.628 volts and 0.0628 amps per square inch for the second electrode. The uncatalyzed electrodes operated under similar conditions at 0.527 volts and 0.0527 amps per square inch. Therefore, the hydrogen reduced platinized electrode showed no advantage whereas the electrode produced by the sodium borohydride reduction showed a 19% increase in voltage and current.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or priviledge is claimed are defined as follows:

1. A process for producing electric power by the electrogenerative halogenation or oxidation of at least one unsaturated hydrocarbon in an electrochemical cell having an anode and cathode separated by a permselective membrane or electrolyte permeable diaphragm comprising:
    (A) flowing a first liquid electrolyte and said unsaturated hydrocarbon to an anolyte compartment of said cell containing a porous anode;
    (B) flowing a second liquid electrolyte and a halogen or oxygen gas to a catholyte compartment of said cell containing a porous cathode;
    (C) reacting said unsaturated hydrocarbon with said halogen or said oxygen at ambient or elevated temperatures and pressures;
    (D) recovering a halogenated or oxygenated hydrocarbon;
    (E) recycling said electrolytes, unsaturated hydrocarbon, and halogen or oxygen gas to said cell.

2. The process of claim 1 wherein said first electrolyte consisting of an aqueous solution of phosphoric acid and an unsaturated hydrocarbon is fed to said porous anode of said cell and wherein said second electrolyte consisting of an aqueous solution of an alkali metal halide and a halogen gas is fed to said porous cathode of said cell.

3. The process of claim 2 wherein said first and second electrolytes are fed respectively to said porous anode and said porous cathode under a pressure of 50 to 150 pounds per square inch at a temperature of 50° to 150° centigrade and said unsaturated hydrocarbon is an olefin.

4. The process of claim 3 wherein said porous electrodes are formed of a particulate carbon material bonded with a thermoplastic polymer and said permselective membrane is an anion permeable membrane.

5. The process of claim 3 wherein said porous electrodes are of a carbon felt material and said permselective membrane is an anion permeable membrane.

6. The process of claim 3 wherein said olefin is selected from the group consisting of ethylene and propylene, said alkali metal halide is sodium chloride and said halogen is chlorine.

7. The process of claim 3 wherein 1-2, dichloroethane is produced in a yield of about 90% to about 97% by weight based upon the weight of chlorine reacted.

8. An electrochemical cell consisting of:
    (A) A cell body,
    (B) A porous anode in electrical contact with a current collector all in an anode compartment,
    (C) A porous cathode in electrical contact with a current collector all in a cathode compartment,
    (D) An anion permeable permselective membrane separating B and C,
    (E) Feeding and exiting means for passing a mixture of a first electrolyte and at least one unsaturated hydrocarbon through said anode compartment, and
    (F) Feeding and exiting means for passing a mixture of a second electrolyte and a halogen or oxygen through said cathode compartment, whereby said cell upon operation at ambient or elevated temperature and pressure is characterized by the production of electric power and an oxidized or halogenated hydrocarbon product.

9. The electrochemical cell of claim 8 wherein said porous cathode and porous anode are selected from the group consisting of carbon felt electrodes and thermoplastic polymer bonded particulate carbon electrodes, and said unsaturated hydrocarbon is an olefin.

10. An electrochemical cell consisting of:
    (A) a cell body, (B) a porous anode in electrical contact with a current collector all in an anode compartment, (C) a porous cathode in electrical contact with a current collector all in a cathode compartment, (D) an electrolyte permeable diaphragm separating B and C, (E) feeding and exiting means for passing a mixture of a first electrolyte and at least one unsaturated hydrocarbon through said anode compartment, and (F) feeding and exiting means for passing a mixture of a second electrolyte and a halogen or oxygen through said cathode compartment, whereby said cell upon operation at ambient or elevated temperature and pressure is characterized by the production of electric power and an oxidized or halogenated hydrocarbon product.

11. The electrochemical cell of claim 10 wherein said porous cathode and porous anode are selected from the group consisting of carbon felt electrodes and thermoplastic polymer bonded particulate carbon electrodes, and unsaturated hydrocarbon is an olefin.

* * * * *

UNITED STATES PATENT AND TRADEMARK OFFICE
CERTIFICATE OF CORRECTION

PATENT NO. : 4,731,168

DATED : March 15, 1988

INVENTOR(S) : John M. McIntyre

It is certified that error appears in the above-identified patent and that said Letters Patent is hereby corrected as shown below:

Col. 10, line 12 (in Claim 11), insert -- said -- between "and" and "unsaturated".

Signed and Sealed this

Eighteenth Day of October, 1988

Attest:

DONALD J. QUIGG

Attesting Officer     Commissioner of Patents and Trademarks